July 29, 1930.  J. ANTONUK  1,771,394
FILM SPLICER
Filed Feb. 20, 1928
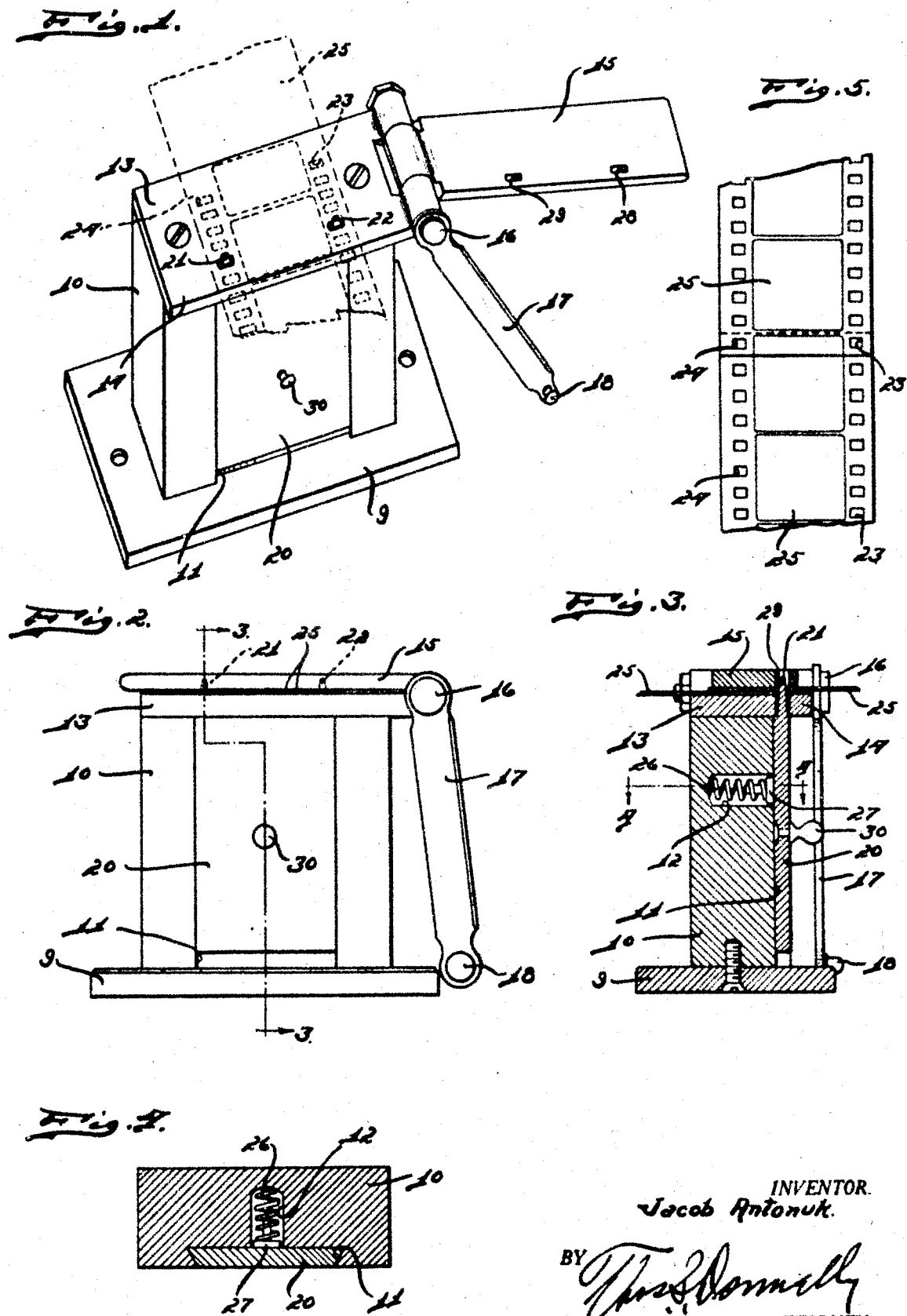
INVENTOR.
Jacob Antonuk.
BY
ATTORNEY.

Patented July 29, 1930

1,771,394

UNITED STATES PATENT OFFICE

JACOB ANTONUK, OF HAMTRAMCK, MICHIGAN

FILM SPLICER

Application filed February 20, 1928. Serial No. 255,569.

My invention relates to a new and useful improvement in a film splicer adapted for use in splicing the films of projection machines which are fed from one reel to another upon projection of the pictures on a screen. Frequently, through defects in the film itself or disarrangements in the mechanism driving the film and various other causes, the film becomes broken, and it is necessary that the same be spliced by securing the ends at the broken portion in overlapped relation. These films are generally provided along the opposite edges with a series of holes in which the teeth of the feeding mechanism and the winding drum engage for driving the film. When the splice is made it is quite important, if when the film is again wound through the feeding mechanism, a break at the same place is not to occur, that the overlapped ends be so arranged as to bring the openings in the overlapped portions in direct registration with each other. It is also necessary that the adjacent ends be spliced in such a manner that only full pictures appear in the film, so that it is necessary in the splicing operation to cut the broken ends exactly at the line of demarcation between successive pictures. It is also necessary that this splicing operation be one which may be easily and quickly performed in order that the performance at which the film is being shown may not be interrupted. The present invention has, as its object, the provision of mechanism in which these advantages enumerated may be obtained.

It is another object of the invention to provide a supporting portion upon which the film may be positioned, and against which may be swung into pressing position a film pressing member for pressing the overlapped ends of the film into engagement until the glue used for cementing the same has set.

Another object is the provision of a slidable prong bearing member adapted to project upwardly beyond the supporting portion and engage in the openings in the film and so arranged that it may be moved downwardly below the surface of the supporting platform, thus permitting a removal of the film after splicing without danger of injury.

Another object is the provision of a cutting mechanism whereby the film may be cut at the proper line of demarcation between pictures.

Another object is the provision of a device whereby the space at the end of the film from which the film cover may be removed may be definitely determined, thus preventing a marring or a disfiguring of the film itself.

Other objects will appear hereinafter.

The invention consists in the combination and arrangement of parts hereinafter described and claimed.

The invention will be best understood by a reference to the accompanying drawings which form a part of this specification and in which, Fig. 1 is a perspective view of the invention.

Fig. 2 is a side elevational view of the invention.

Fig. 3 is a sectional view taken on line 3—3 of Fig. 2.

Fig. 4 is a view taken on line 4—4 of Fig. 3.

Fig. 5 is a plan view of a fragment of film spliced by the invention.

The invention, as shown in the drawings, consists of a base 9 which may be, if desired, secured upon a suitable supporting surface such as a table or the like. Projecting upwardly from this base 9 is a block 10, preferably made of metal and provided in one face with a dovetailed groove 11 communicating with the socket 12 formed in the block 10. Mounted upon the upper surface of the block 10 is the plate 13 which serves as a platform for the film and which is provided with a ledge 14 which overhangs the grooved face of the block 10. Swingably mounted on the plate 13 is a presser member 15, this presser member being swingable on a suitable pintle 16 on which is also swingably mounted a cutting arm or blade 17 having an operating handle or knob 18 mounted thereon. Slidably mounted in the groove 11 is a plate 20, from the upper edge of which project prongs 21 and 22, spaced apart the same distance as are the marginal openings 23 and 24 formed in the film 25.

As shown in Fig. 3 and Fig. 1, these prongs may be projected through openings in the plate 13 so as to project above the upper surface of the plate 13 and engage in the openings 23 and 24 of the film 25 which is placed on the plate 13. Positioned in the socket 12 is a coil spring 26 which embraces a stud 27 projecting inwardly from the face of the plate 20, this prong 26 serving to normally retain the plate 20 in either position of movement.

In operation, when the film has been broken, the portion 25 is placed upon the plate 13 so that the prongs 21 and 22 project through the proper openings 23 and 24 to bring the line of demarcation between successive pictures in alignment with the edge of the overhanging ledge 14. The cover or presser member 15 is then swung over until the prongs 21 and 22 project into the openings 28 and 29, upon which the arm 17 is swung upwardly and downwardly to engage the upper edge of the film strip, and sever it. The cover plate 15 or presser member is so mounted as to lie with one of its edges in alignment with the face of the block 10, thus retaining the film in position with the portion extending from the outer edge of the presser member 15 to the outer edge of the overhanging ledge, and this portion may be moistened for removal of the coating thereon prior to gluing so that a definite well-defined portion is prepared for the application of the glue. After this operation, the opposite end of the film is similarly treated and the two placed in engagement with the prongs in the manner indicated, the lines of demarcation registering and bringing into registration the openings 23 and 24 of the overlapped ends, so that when the device is run through the machine, no misaligning openings or ragged edges may be present. The glue is then applied and the cover 15 swung into position and pressed downwardly until the glue has set. The plate 20 may then be moved downwardly by a downward pressure on the knob 30, so that the upper edge of the prongs 21 and 22 will lie below the upper surface of the plate 13, thus permitting an easy removal of the film from the splicing device.

With a device constructed in this manner an easy and quick splicing of the film is effected. The device is also one which is economical to manufacture and quite durable in use.

While I have illustrated and described the preferred form of my invention, I do not wish to limit myself to the precise details of structure shown, but desire to avail myself of such variations and modifications as come within the scope of the appended claim.

Having thus described my invention what I claim as new and desire to secure by Letters Patent is:

A device of the class described, comprising: a block having a groove formed in one face; a plate slidably mounted in said groove; a pair of spaced prongs projecting upwardly from the upper edge of said plate; a supporting plate mounted on said block and provided with openings for the reception of said prongs; a presser member swingably mounted on one end of said supporting plate and positioned with one of its edges set inwardly of one of the edges of said supporting plate and provided with openings for the reception of said prongs; and a cutting member swingably mounted and adapted upon swinging movement in one direction for pressing closely against said edge of said supporting member.

In testimony whereof I have signed the foregoing specification.

JACOB ANTONUK.